United States Patent
Ono et al.

(10) Patent No.: US 10,465,600 B2
(45) Date of Patent: Nov. 5, 2019

(54) CONTROL DEVICE FOR INTERNAL COMBUSTION ENGINE

(71) Applicant: Mitsubishi Electric Corporation, Tokyo (JP)

(72) Inventors: Takahiko Ono, Hyogo (JP); Junichi Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 57 days.

(21) Appl. No.: 15/572,393

(22) PCT Filed: Jun. 2, 2015

(86) PCT No.: PCT/JP2015/065910
§ 371 (c)(1),
(2) Date: Nov. 7, 2017

(87) PCT Pub. No.: WO2016/194141
PCT Pub. Date: Dec. 8, 2016

(65) Prior Publication Data
US 2018/0119607 A1 May 3, 2018

(51) Int. Cl.
*F02B 37/18* (2006.01)
*F02D 41/24* (2006.01)
(Continued)

(52) U.S. Cl.
CPC ........... *F02B 37/186* (2013.01); *F02B 37/18* (2013.01); *F02D 23/00* (2013.01);
(Continued)

(58) Field of Classification Search
CPC .... F02B 37/186; F02B 37/12; F02D 41/2464; F02D 41/0007; F02D 23/00; F02D 2041/1409; Y02T 10/144
(Continued)

(56) References Cited

U.S. PATENT DOCUMENTS 8,572,961 B2 * 11/2013 Karnik ............... F02B 37/183
60/600
9,316,147 B2 * 4/2016 Wang .................. F02B 37/186
(Continued)

FOREIGN PATENT DOCUMENTS

JP         4434057 B2      3/2010
JP       2015-059549 A    3/2015

OTHER PUBLICATIONS

International Search Report of PCT/JP2015/065910 dated Sep. 1, 2015.

*Primary Examiner* — Hoang M Nguyen
(74) *Attorney, Agent, or Firm* — Sughrue Mion, PLLC; Richard C. Turner

(57) ABSTRACT

Provided is a control device for an internal combustion engine, which is configured to: acquire an internal combustion engine required opening degree of the waste gate valve based on the operation state of the internal combustion engine. When the internal combustion engine required opening degree is full closing, full closing learning control is carried out by converting the target opening degree of the waste gate valve to a target opening degree for full closing learning so as to bring about a state in which the waste gate valve fully closes the exhaust bypass passage. When a state in which the position of the actuator does not change consequently continues for a set period, it is considered that the fully closed state is brought about and the full closing learning is finished, and a correction amount for the feedback control is decreased.

8 Claims, 7 Drawing Sheets

(51) Int. Cl.
*F02D 23/00* (2006.01)
*F02D 41/00* (2006.01)
*F02D 41/14* (2006.01)

(52) U.S. Cl.
CPC ..... *F02D 41/0007* (2013.01); *F02D 41/2464* (2013.01); *F02D 2041/1409* (2013.01); *Y02T 10/144* (2013.01)

(58) Field of Classification Search
USPC ............ 60/602, 607–608, 611, 605.2; 251/129.04
See application file for complete search history.

(56) References Cited

U.S. PATENT DOCUMENTS

| | | | |
|---|---|---|---|
| 9,869,239 B2* | 1/2018 | Saeki | F02D 41/0007 |
| 2011/0023481 A1* | 2/2011 | Baeuerle | F01D 17/105 60/602 |
| 2013/0312406 A1* | 11/2013 | Landsmann | F02B 37/186 60/602 |
| 2015/0113983 A1* | 4/2015 | Yokono | F02B 37/18 60/605.1 |

* cited by examiner

- TARGET OPENING DEGREE Sv[%]
- ACTUAL OPENING DEGREE Pv[%]

INTEGRAL TERM
$(Sv[n]-Pv[n]) \times Ki$

PROPORTIONAL TERM
$(Pv[n]-Pv[n-1]) \times Kp$

FF TERM
$(Sv[n]-Sv[n-1]) \times Kf$

FEEDBACK CORRECTION AMOUNT
$\Delta Mv[n]$

ACTUATOR OPERATION AMOUNT
$Mv[n]=Mv[n-1]+\Delta Mv[n]$

F I G. 7
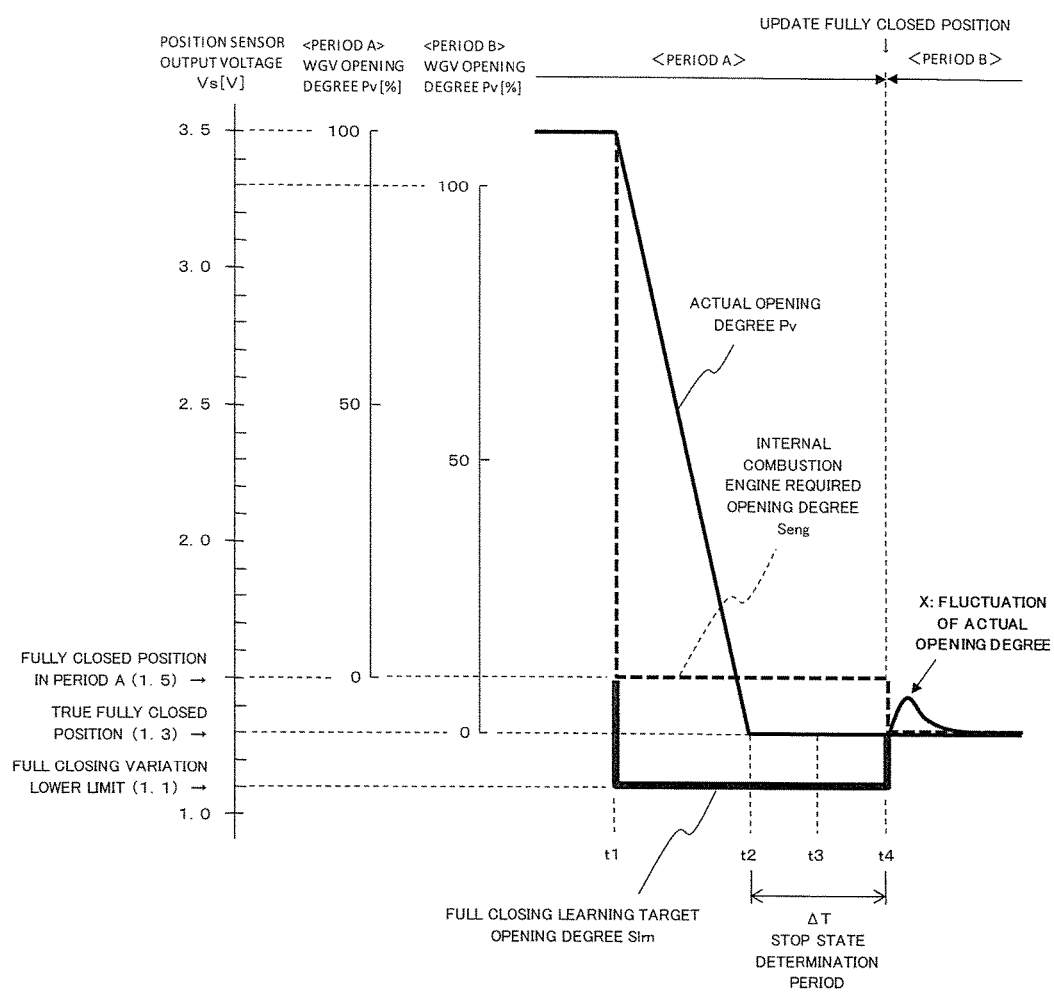

CONTROL DEVICE FOR INTERNAL COMBUSTION ENGINE

CROSS REFERENCE TO RELATED APPLICATIONS

This application is a National Stage of International Application No. PCT/JP2015/065910 filed Jun. 2, 2015, the contents of which are incorporated herein by reference in its entirety.

TECHNICAL FIELD

The present invention relates to a control device for an internal combustion engine (engine) provided with a turbocharger, and more particularly, to a control device configured to apply feedback control to an opening degree of a waste gate valve provided in an exhaust bypass passage of an internal combustion engine so that the opening degree becomes a target opening degree.

BACKGROUND ART

In an internal combustion engine provided with a supercharger, for example, a turbocharger, a waste gate valve (hereinafter mainly abbreviated as WGV) for opening/closing an exhaust bypass passage, which is arranged so as to bypass a flow passage of exhaust gas flowing into a turbine, is provided. Through adjustment of a flow rate of the exhaust gas flowing through the exhaust bypass passage in accordance with the opening degree of the WGV, output of the turbine and a compressor rotating integrally with the turbine is adjusted, and a pressure of intake air compressed by the compressor is controlled to be a desired supercharging pressure.

In the following, a description is given while referring to reference numerals of FIG. 1.

In recent years, there has been known a control device 50 employing an electric actuator 34 incorporating a motor to allow an opening degree of a WGV 31 to be freely set. Out of the documents disclosing such a control device, there is particularly a document disclosing a control device configured to determine a target opening degree of the WGV 31 for acquiring an optimal supercharging pressure in accordance with an operation state of an internal combustion engine 10, and to apply feedback control so that the target opening degree of the WGV 31 and an actual opening degree of the WGV 31 detected by a position sensor 53 match each other (e.g., refer to Patent Literature 1).

The target opening degree of the WGV 31 is determined based on various types of information indicating the operation state of the internal combustion engine. For example, in the control device disclosed in Patent Literature 1, the target opening degree of the WGV 31 is determined based on map data of a rotation speed NE and a throttle opening degree TA of the internal combustion engine.

A position sensor 53 is configured to detect a position of the actuator 34, and output, as an electric signal, an operation position of the WGV 31, which opens/closes in association with the actuator 34. For example, the position sensor 53 having an output characteristic shown in FIG. 5, in which an operation position AOP of the actuator 34 is assigned to the horizontal axis and a position sensor output voltage Vs is assigned to the vertical axis, is adjusted and assembled so as to output Vs=Vmin when the WGV 31 fully closes the exhaust bypass passage 30, and the WGV opening degree Pv on this occasion is set to 0%.

Then, when the actuator 34 is moved from this position to an upper limit of an actuator control range ACR, the output voltage of the position sensor 53 is designed so as to increase by Vrng. Thus, the position sensor output voltage Vs becomes Vmin+Vrng=Vmax when the actuator 34 is moved to the upper limit of the control range ACR.

In other words, the output voltage Vs of the position sensor 53 ranges from Vmin to Vmin+Vrng in accordance with the operation position of the actuator 34, and when Vs=Vmin, the WGV opening degree Pv may be defined to be 0% (WGV 31 fully closed position CP), whereas when Vs=Vmax, the WGV opening degree Pv may be defined to be 100% (WGV 31 fully open position OP).

Thus, an actual opening degree Pv of the WGV 31 is acquired from the position sensor output voltage Vs in accordance with Expression (1).

$$Pv=(Vs-Vmin)\div Vrng\times 100 \qquad \text{Expression (1)}$$

where:
- Pv: WGV opening degree (%)
- Vs: Position sensor output voltage (V)
- Vmin: Fully closed position (V)
- Vmax: Fully open position (V)
- Vrng=Vmax−Vmin: Output voltage range for the movement from the lower limit to the upper limit of the actuator control range The fully closed position CP of the WGV 31 may deviate as a result of an assembly tolerance when the WGV 31 and the actuator 34 are connected to each other, a thermal expansion or wear of members, or other causes. In consideration of the occurrence of the deviation, an operable range AOR of the actuator 34 is designed so as to be wider than the actuator control range ACR. The position sensor 53 is also configured to output a voltage of from a lowest voltage VL to a highest voltage VH, which are output voltages when the actuator 34 is at both ends of the operable range AOR.

Moreover, as a method of controlling the actuator 34 so that the opening degree of the WGV 31 matches the target opening degree, there is generally used feedback control of using proportional-integral calculation (PI) based on the target opening degree and the actual opening degree, calculation (PID) of combining the proportional-integral calculation with derivative calculation, or calculation of combining the proportional-integral calculation with feed-forward (FF) calculation. The feedback control is used to automatically correct the operation amount of the actuator 34 so that the target opening degree and the actual opening degree match each other even when a difference occurs between the target opening degree and the actual opening degree, thereby resolving the difference between the target opening degree and the actual opening degree.

FIG. 6A to FIG. 6F are time charts for illustrating an example of behaviors of a target opening degree and an actual opening degree of the WGV 31 and respective calculation results when the target opening degree is changed stepwise in accordance with feedback control in which the proportional-integral calculation is combined with the FF calculation. For the sake of a simple description, the derivative calculation is omitted.

FIG. 6A to FIG. 6F have the time as their horizontal axes in common, and have, as their vertical axes, respective calculation results of behaviors of a target opening degree Sv and an actual opening degree Pv, an integral term, a proportional term, an FF term, a feedback correction amount, and an actuator operation amount in the stated order from the top as waveform charts. Those calculation results are acquired in accordance with Expression (2) and Expression (3). As expressed by Expression (2), an actuator operation amount Mv[n] is acquired by adding a feedback correction amount ΔMv[n] to a previous value Mv[n−1] of an actuator operation amount Mv.

Moreover, as expressed by Expression (3), the feedback correction amount ΔMv[n] is acquired as a sum of three calculation terms of an integral term acquired by multiplying a difference between a target opening degree Sv[n] and an actual opening degree Pv[n] by an integral gain Ki, a proportional term acquired by multiplying a difference between a current value Pv[n] of the actual opening degree and a previous value Pv [n−1] of the actual opening degree by a proportional gain Kp, and an FF term acquired by multiplying a difference between a current value Sv[n] and a previous value Sv[n−1] of the target opening degree by an FF gain Kf.

$$Mv[n]=Mv[n-1]+\Delta Mv[n] \quad \text{Expression (2)}$$

where:
- Mv[n]: Operation amount (current value)
- Mv[n−1]: Operation amount (previous value)
- ΔMv[n]: Feedback correction amount (current value)

$$\Delta Mv[n]=(\text{integral term})+(\text{proportional term})+(\text{FF term})=(Sv[n]-Pv[n])\times Ki+(Pv[n]-Pv[n-1])\times Kp+(Sv[n]-Sv[n-1])\times Kf \quad \text{Expression (3)}$$

where:
- Sv[n]: Target opening degree (current value)
- Sv[n−1]: Target opening degree (previous value)
- Pv[n]: Actual opening degree (current value)
- Pv[n−1]: Actual opening degree (previous value)
- Ki: Integral gain
- Kp: Proportional gain (Kp<0)
- Kf: FF gain
- [n] indicates a calculated value at the current control timing, and [n−1] indicates a calculated value at the previous control timing.

In the above-mentioned feedback control, the integral term acts to resolve the steady difference between the target opening degree and the actual opening degree. The proportional term acts to decrease the operation amount given by the FF term in accordance with a degree of convergence of the difference between the target opening degree and the actual opening degree. The FF term acts to resolve the difference between the target opening degree and the actual opening degree occurring in accordance with a change amount of the target opening degree when the target opening degree changes.

The operation amount of the actuator 34 is corrected through use of the feedback correction amount, which is the sum of the integral term, the proportional term, and the FF term acquired in this way, and the control is applied so that the target opening degree and the actual opening degree of the WGV 31 match each other.

The fully closed position of the WGV 31 may deviate resulting from the assembly tolerance when the WGV 31 and the actuator 34 are connected to each other, the thermal expansion or wear of members, and other causes as described above. However, there arises such a problem that when the fully closed position of the WGV 31 deviates, even in a case where the target opening degree and the actual opening degree in terms of the control match each other, an actual flow rate of the exhaust gas flowing through the exhaust bypass passage 30 deviates, and consequently, the pressure of the intake air to be compressed by the compressor deviates from the desired supercharging pressure. Thus, in order to prevent controllability of the supercharging pressure from degrading, the fully closed position of the WGV opening degree needs to be learned in order to handle the degradation.

As a method of learning the fully closed position of the WGV opening degree, for example, the following method is employed. Specifically, a condition under which the output voltage of the position sensor 53 becomes the minimum value VL (refer to FIG. 5) as a result of an occurrence of a deviation of the fully closed position toward the lower limit side is recognized in advance by measurement or the like. Then, when an internal combustion engine required opening degree, which is determined based on the operation state of the internal combustion engine 10, is set to 0% (WGV 31 full closing), the target opening degree is replaced by an opening degree acquired by assigning the minimum value VL to Vs of Expression (1) in place of the internal combustion engine required opening degree, thereby carrying out the feedback control.

As a result, irrespective of the true fully closed position in the variation range, a state in which the WGV 31 is pressed against the operation position at which the exhaust bypass passage 30 is completely closed can be brought about.

Then, it is determined whether or not the actual opening degree no longer changes when the control is carried out toward the target opening degree converted based on the minimum value VL. Then, the actual position on this occasion is determined to be the true fully closed position, and the output voltage of the position sensor at that time is updated as a full closing learned position.

Referring to an operation time chart of the target opening degree and the actual opening degree when "full closing position learning" of the WGV opening degree illustrated in FIG. 7 is carried out, a description is given of this method. In this time chart, there is illustrated an example in which the time is assigned to the horizontal axis, and the position sensor output voltage Vs and the actual opening degree Pv of the WGV 31 converted in accordance with Expression (1) are assigned to the vertical axes.

In <Period A> of FIG. 7, the control device 50 currently recognizes the full closing learned position Vmin as 1.5 V. Moreover, when Vrng is 2 V (design value), the WGV opening degree Pv in <Period A> is acquired in accordance with Expression (4).

$$Pv(\%)=(Vs-V\min)\div Vrng\times 100=(Vs-1.5)\div 2\times 100 \quad \text{Exression (4)}$$

Before a time t1 in <Period A>, an internal combustion engine required opening degree Seng is 100%, and the target opening degree is thus set to a position corresponding to Vs=3.5 V.

Then, at the time t1, the internal combustion engine required opening degree Seng (represented as the dotted line) changes from 100% to 0% (from 3.5 V to 1.5 V, which is calculated backward in terms of Vs in accordance with Expression (4)). Thus, the full closing learning control changes the target opening degree Sv from 0%, which is the internal combustion engine required opening degree Seng, to a full closing learning target opening degree Slrn, which is an opening degree when the position sensor output voltage becomes the minimum value VL due to the occurrence of the deviation toward the lower limit side of the fully closed position.

Assuming that VL=1.1, (VL−1.5)÷2×100=−20% is acquired in accordance with Expression (4), and the feedback control is applied to the actual opening degree Pv toward −20% in the control device 50.

When it is assumed that the true fully closed position deviates from the full closing learned position Vmin (=1.5

V) recognized by the control device 50 to the position corresponding to Vs=1.3 V, the feedback control is applied to the actual opening degree Pv of the WGV 31 toward −20% (position corresponding to Vs=1.1 V), which is the replaced target opening degree Slrn, but the actual opening degree Pv does not become equal to or less than −10% (Vs=1.3 V), and the opening degree of the WGV 31 stays at −10% after a time t2.

On this occasion, the WGV 31 is pressed against the position at which the exhaust bypass passage 30 is completely closed, and the control device 50 thus determines that the opening degree of WGV 31 stays at −10% while providing a protection period as a stop determination period ΔT. The reason for providing the stop determination period ΔT is to prevent a determination error in the learning of the true fully closed position, and is set in order to positively determine the state in which the WGV opening degree Pv does not move continues for ΔT, which is the predetermined period, through use of the output voltage Vs of the position sensor 53. Thus, the full closing learned position is not updated at a time t3 between the time t2 and a time t4, at which the stop determination period ΔT has not elapsed.

Then, at the time t4, the stop determination period ΔT has elapsed since the time t2, and the true fully closed position is thus determined to be Vs=1.3 V. The full closing learned position Vmin is then updated from 1.5 V to 1.3 V, and the full closing learning control is finished. Simultaneously, the internal combustion engine target opening degree Seng is also returned to 0%, which is the original internal combustion engine required opening degree, at the time t4.

As a result, after the time t4, the full closing learned position is corrected to Vmin=1.3 V, and the WGV opening degree Pv in <Period B> may now be acquired from Expression (5).

$$Pv(\%)=(Vs-Vmin)\div Vrng\times 100=(Vs-1.3)\div 2\times 100 \quad \text{Expression (5)}$$

The fully closed position of the WGV 31 is updated to the correct position by applying the full closing learning control described above. Thus, the flow rate of the exhaust gas flowing through the exhaust bypass passage 30 is prevented from deviating, and the degradation in the controllability of the supercharging pressure is thus avoided.

CITATION LIST

Patent Literature

[PTL 1] JP 4434057 B2

SUMMARY OF INVENTION

Technical Problem

There is no problem in the point that because the fully closed position of the WGV is updated to the correct position by applying the full closing learning control described above, the flow rate of the exhaust gas flowing through the exhaust bypass passage is prevented from deviating, and the degradation in the controllability of the supercharging pressure is thus avoided.

However, when the feedback calculation terms calculated before and after the update of the full closing learned position are investigated in detail, it is understood that the following problem is hidden.

Before and after the time t4 of FIG. 7, that is, before and after the time at which <Period A> switches to <Period B>, the full closing learned positions, the target opening degrees, and the actual opening degrees take values of Table 1.

TABLE 1

Full closing learned positions, target opening degrees, and actual opening degrees before and after update by learning

| | <Period A> (Full closing learned position = 1.5 V) | | <Period B> (Full closing learned position = 1.3 V) | |
|---|---|---|---|---|
| | Value converted from Vs to opening degree | Position sensor voltage Vs | Value converted from Vs to opening degree | Position sensor voltage Vs |
| Target opening degree | Sv[n − 1] = −20% | 1.1 V | Sv[n] = 0% | 1.3 V |
| Actual opening degree | Pv[n − 1] = −10% | 1.3 V | Pv[n] = 0% | 1.3 V |

When the respective feedback calculation terms in <Period B> immediately after the time t4 are calculated in accordance with Expression 5 from the values of Table 1, the following calculation results are generated. The respective values are then summed, and the sum is reflected to the correction amount of the actuator 34.

$$\text{Integral term}=(Sv[n]-Pv[n])\times Ki=0$$

$$\text{Proportional term}=(Pv[n]-Pv[n-1])\times Kp=10\%\times Kp$$

$$\text{FF term}=(Sv[n]-Sv[n-1])\times Kf=20\%\times Kf$$

However, immediately before the time t4 at which the full closing learned position is updated, the WGV 31 is at the true fully closed position (position corresponding to Vs=1.3 V), and immediately after the time t4 at which the full closing learned position is updated, the opening degree of the WGV 31 has already reached 0% (position corresponding to Vs=1.3 V), which is the internal combustion engine required opening degree. Thus, the actuator operation amount immediately after the update of the learned position does not need to be changed from the operation amount calculated at the control timing immediately before, and only needs to be held to be the operation amount calculated at the previous calculation timing.

However, the target opening degree and the converted value of the actual opening degree have changed as a result of the update of the full closing learned position and the switching of the target opening degree, and thus the proportional term and the FF term generate the unnecessary values as described above, and those values are added to the feedback correction amount, which acts to move the operation position of the WGV 31. As a result, there arises such a problem that the feedback correction amount ΔMv is added to the actuator operation amount, and the actual opening degree fluctuates as indicated as "X" in FIG. 7.

As a result, there arises such a problem that the pressure of the intake air compressed by the compressor deviates from the desired supercharging pressure.

Moreover, when the internal combustion engine required opening degree Seng changes from 0% to a value that is not 0% before the stop determination period ΔT elapses, the full closing learning control is finished before the full closing learned position Vmin is updated. For example, when the internal combustion engine required opening degree Seng is changed from 0% to 5% before the stop determination period ΔT elapses, the full closing learning control is finished without updating the full closing learned position. As a result, the target opening degree is retuned from −20%, which is the target opening degree of the full closing learning, to 5%, which is the internal combustion engine required opening degree Seng. Then, the full closing learned positions, the target opening degrees, and the actual opening degrees before and after the change take values of Table 2.

TABLE 2

Full closing learned positions, target opening degrees, and actual opening degrees before and after end of full closing learning control before update of full closing learned position

| | Immediately before end of full closing learning control (Full closing learned position = 1.5 V) | | Immediately after end of full closing learning control (Full closing learned position = 1.5 V) | |
|---|---|---|---|---|
| | Value converted from Vs to opening degree | Position sensor voltage Vs | Value converted from Vs to opening degree | Position sensor voltage Vs |
| Target opening degree | Sv[n − 1] = −20% | 1.1 V | Sv[n] = 5% | 1.6 V |
| Actual opening degree | Pv[n − 1] = −10% | 1.3 V | Pv[n] = −10% | 1.3V |

When the respective calculation terms of the feedback correction amount ΔMv at a time (e.g., t3) immediately after the end of the full closing learning control and before the stop determination period ΔT elapses are calculated in accordance with Expression (4) from the values of Table 2, the following calculation results are generated. The respective values are then summed, and the sum is reflected to the correction amount ΔMv of the actuator.

Integral term=$(Sv[n]-Pv[n]) \times Ki=15\% \times Ki$

Proportional term=$(Pv[n]-Pv[n-1]) \times Kp=0$

FF term=$(Sv[n]-Sv[n-1]) \times Kf=25\% \times Kf$

Also in this case, in principle, the actual opening degree of −10% immediately before the end of the full closing learning control only needs to be fed back to the target opening degree of 5% immediately after the full closing learning control. In other words, the same feedback correction amount ΔMv as that in a case where the target opening degree Sv changes by 15% from the state where the target opening degree Sv and the actual opening degree Pv match each other only needs to be generated.

Thus, there is no problem in the calculation result of the proportional term, but the FF term is an unnecessary value. There is thus such a problem that this FF term is added to the feedback correction amount ΔMv, the feedback correction amount ΔMv is added to the actuator operation amount, and performance to track the target opening degree SV thus degrades.

As a result, there arises such a problem that the pressure of the intake air compressed by the compressor deviates from the desired supercharging pressure.

The present invention has been made in view of the above-mentioned problem, and therefore has an object to provide a control device for an internal combustion engine, which is capable of preventing an opening degree of a WGV from deviating from a target opening degree due to unnecessary feedback calculation amounts calculated at a control timing at which full closing learning control for learning a fully closed position of the WGV opening degree is finished.

Solution to Problem

In order to achieve the above-mentioned object, according to one embodiment the present invention, there is provided a control device for an internal combustion engine, which is configured to: input information on an operation state of the internal combustion engine and information on a position of an actuator configured to control an opening degree of a waste gate valve provided in an exhaust bypass passage of the internal combustion engine; acquire an internal combustion engine required opening degree of the waste gate valve based on the operation state; and apply feedback control to the actuator while the internal combustion engine required opening degree is set as a target opening degree of the waste gate valve, in which, when the internal combustion engine required opening degree is full closing, full closing learning control is carried out by converting the target opening degree of the waste gate valve to a target opening degree for full closing learning so that the waste gate valve is brought into a fully closed state in which the waste gate valve fully closes the exhaust bypass passage, and when a state in which the position of the actuator does not change consequently continues for a set period, it is considered that the fully closed state is brought about and the full closing learning is finished, and a correction amount for the feedback control is decreased.

Advantageous Effects of the Invention

The control device for an internal combustion engine according to the present invention is configured to convert the target opening degree of the waste gate valve to the target opening degree for the full closing learning so that the waste gate valve is brought into the fully closed state when the internal combustion engine required opening degree is the full closing, consider that the fully closed state is brought about and the full closing learning control is finished when the state in which the position of the actuator does not change continues for the set period, and decrease the correction amount of the feedback control at this time point. Thus, the opening degree of the waste gate valve can be prevented from deviating from the target opening degree due to the unnecessary feedback calculation amounts calculated before and after the control timing at which the full closing learning control for learning the full closing learned position of the waste gate valve opening degree is finished.

BRIEF DESCRIPTION OF DRAWINGS

FIG. 7 is a time chart for illustrating a method of learning a fully closed position of a WGV opening degree, and a problem that arises when execution of the full closing learning control is finished.

DESCRIPTION OF EMBODIMENTS

First Embodiment

Figure 1:
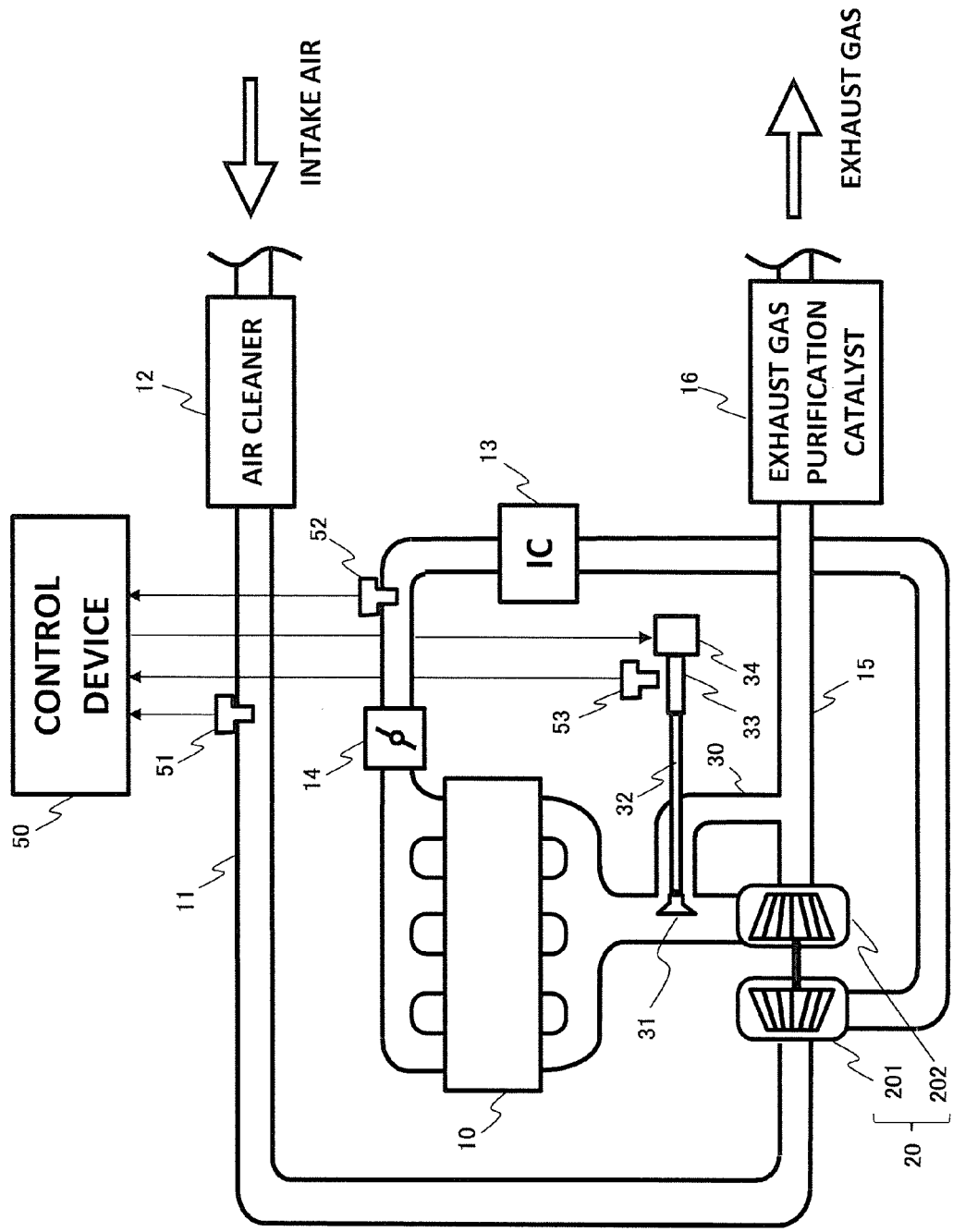
FIG. 1 is a configuration diagram for illustrating an entire system of a hitherto-known internal combustion engine to which a control device for an internal combustion engine according to a first embodiment of the present invention is applied.

FIG. 1 is a diagram for illustrating a configuration of an internal combustion engine system to which a control device for an internal combustion engine according to a first embodiment of the present invention is applied. In FIG. 1, an air cleaner 12 is mounted to an inlet of an intake passage 11 of an internal combustion engine 10. An airflow sensor 51 for detecting an intake air amount is provided on a downstream side of the air cleaner 12.

A turbocharger 20 is provided on a downstream side of the airflow sensor 51. The turbocharger 20 includes a compressor 201 and a turbine 202. The compressor 201 and the turbine 202 are integrally coupled to each other through a coupling shaft. The compressor 201 is rotationally driven through energy of exhaust gas input to the turbine 202. An intercooler (IC) 13 for cooling the compressed air is arranged on a further downstream side of the compressor 201. A throttle valve 14 is arranged on a further downstream side of the intercooler 13. A throttle upstream pressure sensor 52 for detecting a pressure of intake air supercharged by the turbocharger 20 is provided between the intercooler 13 and the throttle valve 14.

Moreover, an exhaust system of the internal combustion engine 10 is provided with an exhaust passage 15. The turbine 202 of the turbocharger 20 is provided in the course of the exhaust passage 15. Moreover, the exhaust passage 15 is provided with an exhaust bypass passage 30 for bypassing the turbine 202, thereby connecting input and output sides of the turbine 202. In this exhaust bypass passage 30, a WGV 31 serving as an exhaust bypass valve is arranged. Moreover, an exhaust gas purification catalyst 16 for purifying the exhaust gas is provided on a downstream side of the turbine 202.

The WGV 31 arranged in the exhaust bypass passage 30 is mechanically connected to one end of a joint member 32. Another end of the joint member 32 is mechanically connected to an output shaft 33 of an actuator 34 serving as an exhaust bypass valve drive device. A position sensor 53 for detecting position information on the actuator 34, which correlates with an open position of the WGV 31, is provided in a vicinity of the actuator output shaft 33.

In the first embodiment, the position sensor 53 is separated from the actuator 34, but may be integrated into the actuator 34.

Further, the control device for an internal combustion engine according to the first embodiment of the present invention includes a control device 50. A crank angle sensor, a throttle opening degree sensor, and other sensors, which are not shown, in addition to the airflow sensor 51, the throttle upstream pressure sensor 52, and the position sensor 53 described above, are connected to an input part of the control device 50 in order to detect an operation state of the internal combustion engine 10.

Injectors, ignition coils, and other actuators, which are not shown, in addition to the actuator 34, are connected to an output part of the control device 50 in order to control the operation state of the internal combustion engine 10. The control device 50 drives the above-mentioned various types of actuators based on the above-mentioned various types of input information, thereby optimally controlling a combustion state and an output torque of the internal combustion engine 10.

A motor capable of rotating forward and backward is integrated into the actuator 34, and an actuator output shaft 33 for converting a rotational motion of this motor to a translational motion and outputting the translational motion is provided to the actuator 34. This actuator output shaft 33 is movable in its axial direction in accordance with a current supply direction of the motor. When the current is supplied to the motor toward a direction of pushing out the actuator output shaft 33 toward the WGV 31 side, the WGV 31 can be moved toward an open side (left side of FIG. 1) via the joint member 32. Conversely, when the current is supplied to the motor toward a direction of pulling in the actuator output shaft 33 toward the actuator 34 side, the WGV 31 can be moved toward a closed side (right side of FIG. 1) via the joint member 32.

Moreover, the position sensor 53 is provided in a vicinity of a side part of the actuator output shaft 33, and a position in the axial direction of the actuator output shaft 33 detected by this position sensor 53 is input as an operation position of the WGV 31, namely, the operation position of the WGV 31, to the control device 50.

Figure 2:
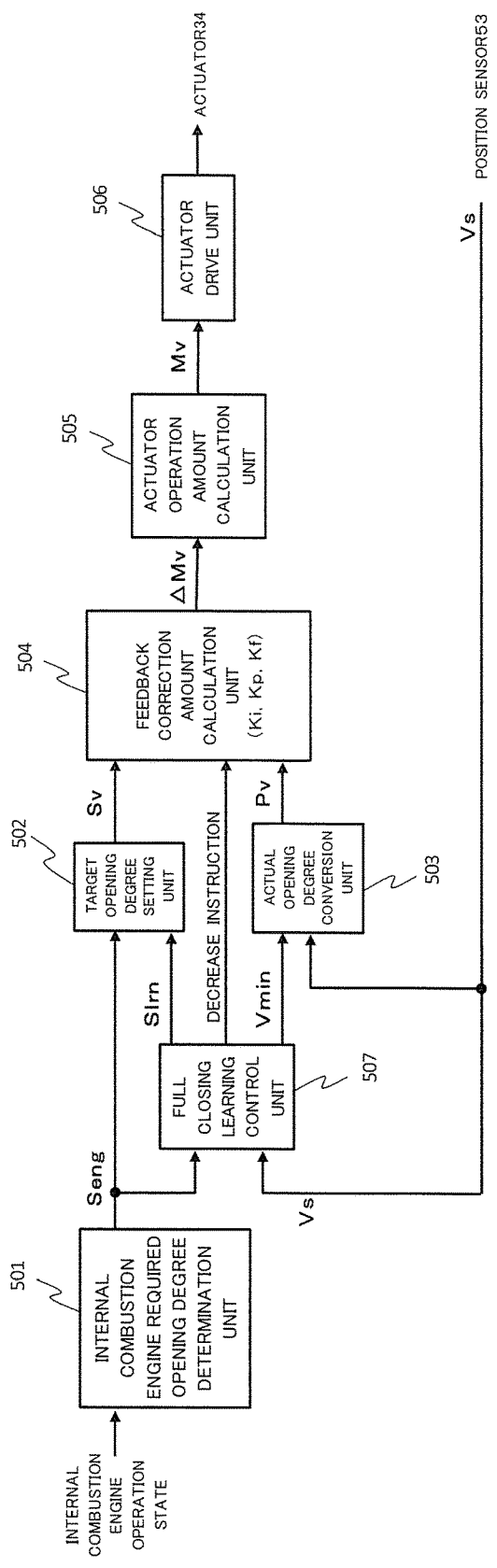
FIG. 2 is a functional block diagram for illustrating the control device for an internal combustion engine according to the first embodiment of the present invention.

FIG. 2 is a block diagram for illustrating the control device 50 for an internal combustion engine according to the first embodiment of the present invention illustrated in FIG. 1. In accordance with FIG. 2, referring to FIG. 7, first, a description is given of a configuration and an operation relating to basic control of the WGV 31.

An internal combustion engine required opening degree determination unit 501 is configured to input, in addition to the number of revolutions and a throttle opening degree of the internal combustion engine, a plurality of pieces of information indicating the operation state of the internal combustion engine, for example, the intake air amount detected by the airflow sensor 51 and the supercharging pressure detected by the throttle upstream pressure sensor 52, and to determine an internal combustion engine required opening degree Seng of the WGV 31 based on those pieces information. This is a publicly-known technology.

A target opening degree setting unit 502 is configured to set the internal combustion engine required opening degree Seng determined by the internal combustion engine required opening degree determination unit 501 as a target opening degree Sv of the WGV 31. An actual opening degree conversion unit 503 is configured to input an electric signal Vs representing an operation position of the WGV 31 detected by the position sensor 53. The actual opening degree conversion unit 503 is configured to convert the operation position of the WGV 31 detected by the position sensor 53 to an actual opening degree Pv based on this position signal Vs and a full closing learned position Vmin of the WGV 31.

A feedback correction amount calculation unit 504 is configured to carry out feedback control at each predetermined calculation timing based on the target opening degree Sv set by the target opening degree setting unit 502 and the actual opening degree Pv obtained by conversion by the actual opening degree conversion unit 503, thereby calculating a feedback correction amount ΔMv for correcting an actuator operation amount Mv.

An actuator operation amount calculation unit 505 is configured to add an actuator operation amount Mv[n−1] output from an actuator drive unit 506 at a previous calculation timing and the feedback correction amount ΔMv calculated by the feedback correction amount calculation unit 504 to each other, thereby calculating an actuator operation amount Mv[n] to be output to the actuator at a current control timing (refer to Expression (2)).

The actuator drive unit 506 is configured to output the actuator operation amount Mv[n] calculated by the actuator operation amount calculation unit 504 to the actuator 34, and the actuator 34 is driven in accordance with the actuator operation amount Mv[n].

The operation amount of the actuator 34 is a parameter for instructing a current supply direction and a current supply amount of the motor integrated into the actuator 34, and is given by, for example, a PWM signal (e.g., on-duty signal ranging from −100% to +100%).

A description is now given of an operation relating to learning control for a fully closed position of the WGV 31.

A full closing learning control unit 507 is configured to determine whether or not the internal combustion engine required opening degree Seng determined by the internal combustion engine required opening degree determination unit 501 is 0% (that is, a full closing request). As a result, when the internal combustion engine required opening degree Seng is 0%, the full closing learning control unit 507 issues an instruction to the target opening degree setting unit 502 so as to set a full closing learning target opening degree Slrn as the target opening degree of the WGV 31 in place of the internal combustion engine required opening degree Seng.

When the target opening degree setting unit 502 receives the instruction to set the full closing learning target opening degree Slrn as the target opening degree Sv of the WGV 31, the target opening degree setting unit 502 switches the target opening degree Sv from the internal combustion engine required opening degree Seng to the full closing learning target opening degree Slrn, and outputs the target opening degree Sv to the feedback correction amount calculation unit 504. When the internal combustion engine required opening degree Seng determined by the internal combustion engine required opening degree determination unit 501 is no longer 0%, the switching instruction for the target opening degree Sv directed to the target opening degree setting unit 502 is canceled, and the target opening degree setting unit 502 returns the target opening degree Sv to the internal combustion engine required opening degree Seng to reset the target opening degree Sv.

Moreover, the full closing learning control unit 507 is configured to determine whether or not the output voltage Vs of the position sensor 53 has continued to be constant for a stop determination period ΔT while the actuator 34 is being driven for the target opening degree Sv switched to the full closing learning target opening degree Slrn.

Specifically, as described above in the "Background Art" section, the full closing learning control unit 507 determines that the WGV 31 is pressed against a true fully closed position when a state in which the output voltage Vs of the position sensor 53 is constant continues for the stop determination period ΔT or more. This state corresponds to "end of the full closing learning control".

Then, when the full closing learning control unit 507 can determine that the WGV 31 is pressed against the true fully closed position, the full closing learning control unit 507 cancels the switching instruction for the target opening degree Sv directed to the target opening degree setting unit 502, and issues to the actual opening degree conversion unit 503 an instruction to update the current output voltage Vs of the position sensor 53 as the full closing learned position Vmin. When the actual opening degree conversion unit 503 receives the instruction to update the full closing learned position Vmin, the actual opening degree conversion unit 503 updates the current output voltage Vs of the position sensor 53 as the full closing learned position Vmin. Subsequently, the actual opening degree conversion unit 503 converts, as the updated full closing learned position Vmin, the output voltage Vs of the position sensor 53 to the opening degree Pv of the WGV 31.

Moreover, the full closing learning control unit 507 instructs the actual opening degree conversion unit 503 to update the full closing learned position Vmin, and simultaneously issues to the feedback correction amount calculation unit 504 an instruction to decrease the feedback correction amount ΔMv to be calculated at the current calculation timing. As a result, the feedback correction amount calculation unit 504 internally decreases the feedback correction amount ΔMv to be calculated at the current control timing.

Figure 3:
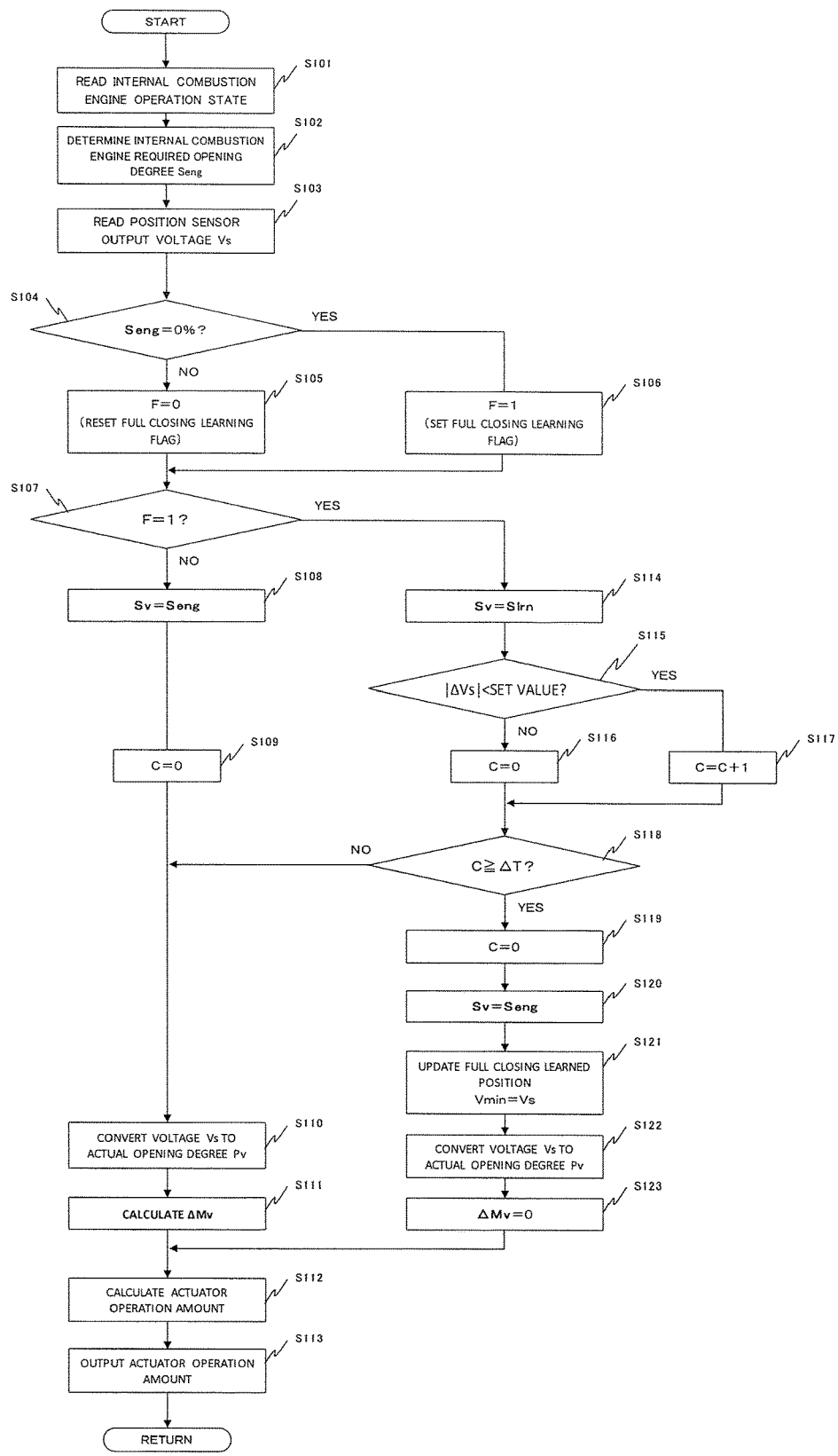
FIG. 3 is a flowchart for illustrating an operation of the control device for an internal combustion engine according to the first embodiment of the present invention.

Referring to a flowchart of FIG. 3, a description is now given of the operation of the control device 50 for an internal combustion engine according to the first embodiment of the present invention. A flow of FIG. 3 basically corresponds to the above-mentioned functions of FIG. 2.

In FIG. 3, in Step S101, in addition to the number of revolutions and the throttle opening degree of the internal combustion engine 10, the plurality of pieces of information indicating the operation state of the internal combustion engine 10, for example, the intake air amount detected by the airflow sensor 51 and the supercharging pressure detected by the throttle upstream pressure sensor 52, are read.

In Step S102, the internal combustion engine required opening degree Seng of the WGV 31 is determined based on the various pieces of information on the operation state of the internal combustion engine 10 read in Step S101. Then, in Step S103, the detected voltage Vs of the position sensor 53 is read.

Subsequently, in Step S104, whether or not the internal combustion engine required opening degree Seng determined in Step S102 is 0%, that is, whether or not there is a full closing request, is determined. When the internal combustion engine required opening degree Seng is not 0% (in a case of NO), the operation proceeds to Step S105, and a full closing learning flag F is set to 0. When the internal combustion engine required opening degree Seng is 0% (in a case of YES), the operation proceeds to Step S106, and the full closing learning flag F is set to 1.

Then, in Step S107, the state of the full closing learning flag F is determined. When F is 0 (in a case of NO), the operation proceeds to Step S108. When F is 1 (in a case of YES), the operation proceeds to Step S114.

In Step S107, when F is 0 (in the case of NO), the internal combustion engine required opening degree is not 0%. Thus, the full closing learning control is not carried out, and respective pieces of processing of Steps S108 to S111 are carried out.

In Step S108, the internal combustion engine required opening degree Seng is set as the target opening degree Sv. In Step S109, a counter C is cleared to 0. The counter C is a counter used to determine the stop determination period ΔT of the WGV 31 when the full closing learning is carried out, and is not necessary when the full closing learning flag F is 0. However, the counter C is cleared to 0 by way of precaution.

Figure 5:
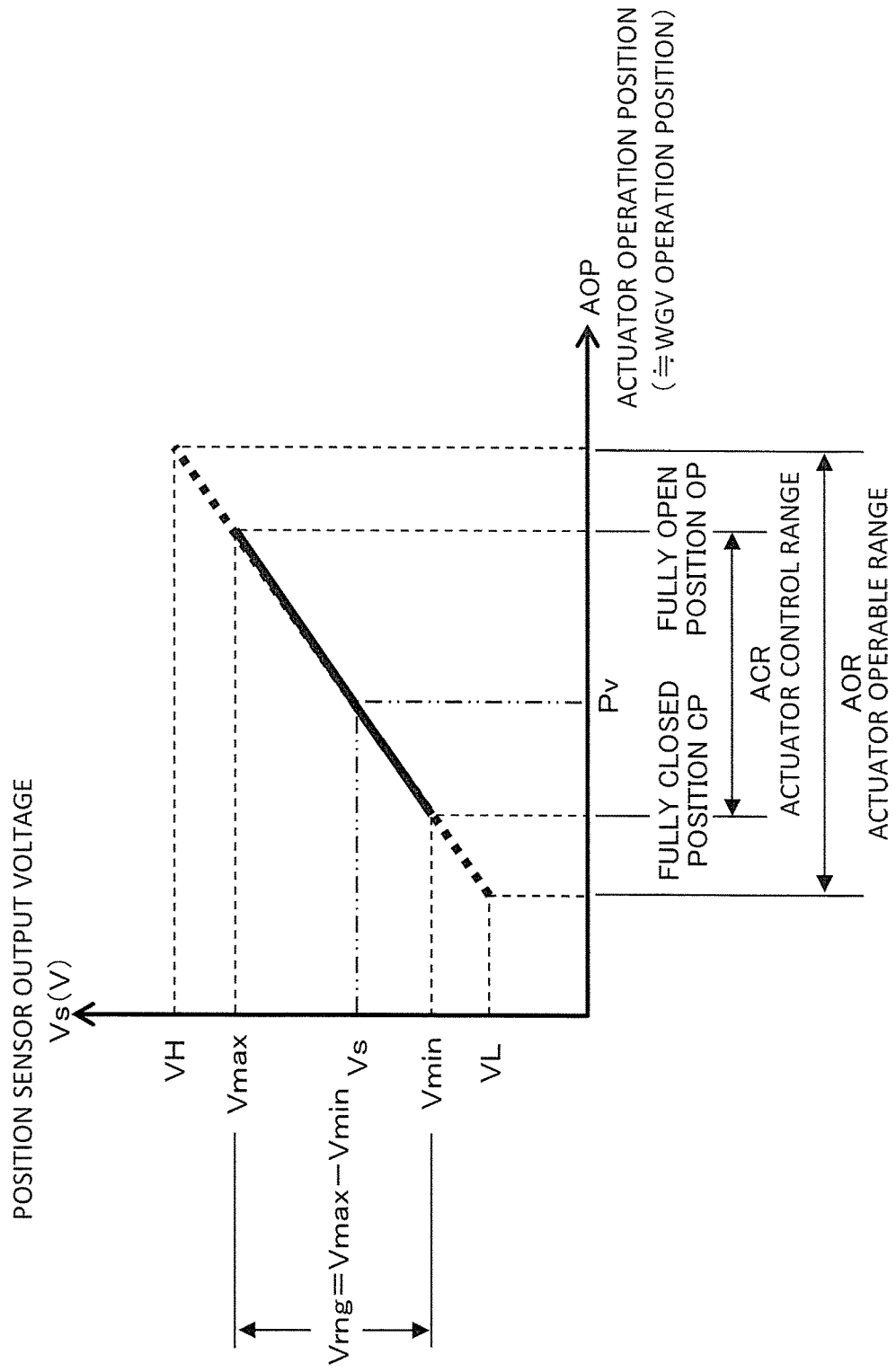
FIG. 5 is a characteristic graph for showing a relationship between an operation position of an actuator and an output voltage of a position sensor.
Figure 6A:
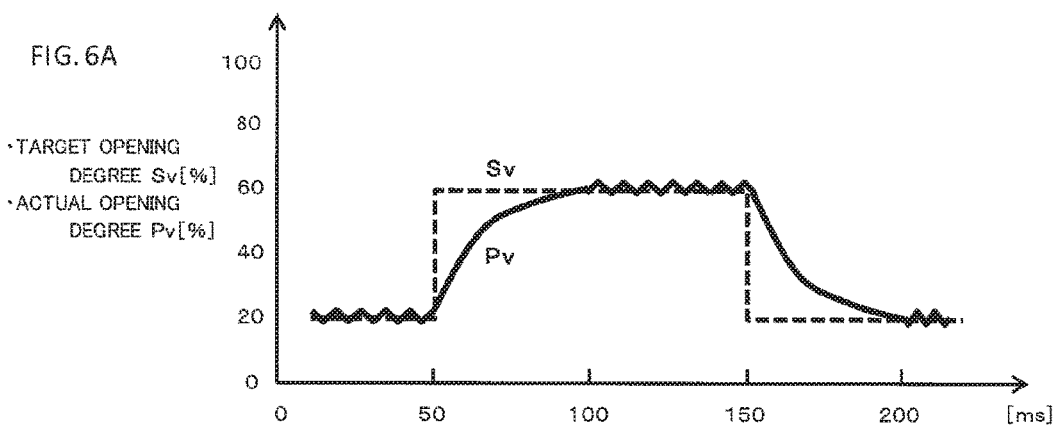
FIG. 6 are time charts for illustrating a behavior of an actual opening degree of a WGV and respective feedback control calculation terms when a target opening degree of the WGV is changed stepwise in accordance with feedback control.
Figure 6B:
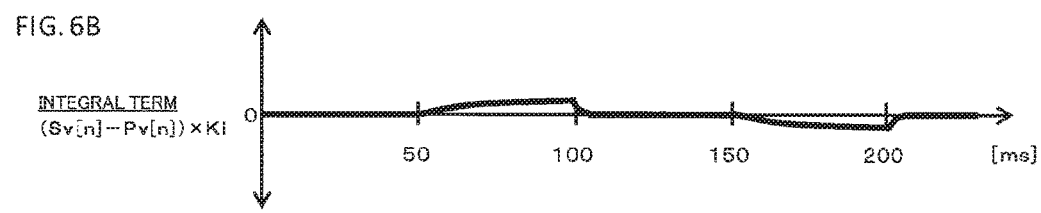
Figure 6C:
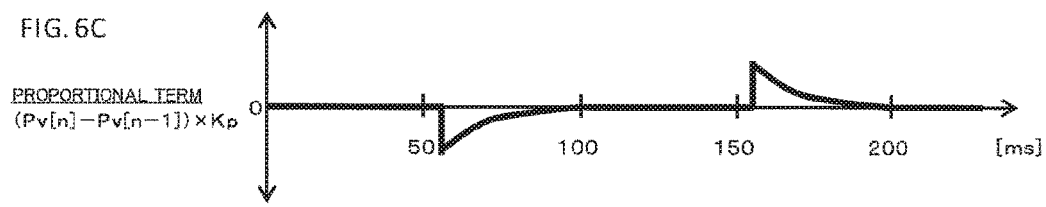
Figure 6D:
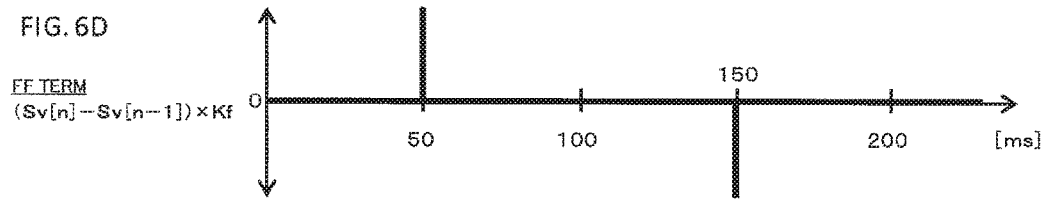
Figure 6E:
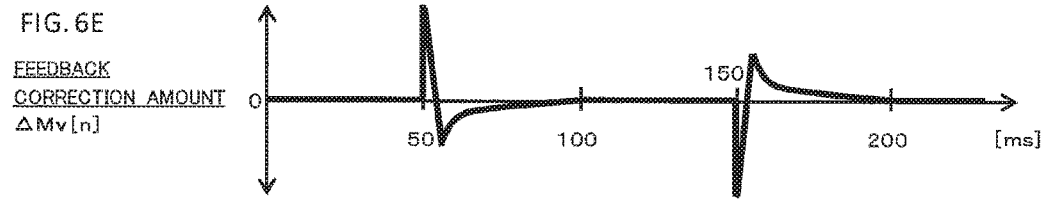
Figure 6F:
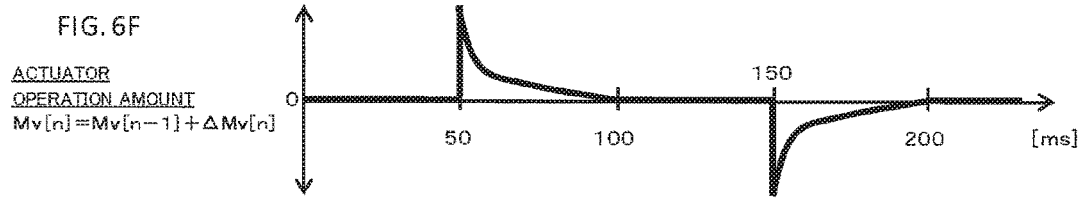

In Step S110, the output voltage Vs of the position sensor 53 is converted to the actual opening degree Pv based on the current full closing learned position Vmin in accordance with the above-mentioned map of FIG. 5. In Step S111, the feedback correction amount ΔMv is calculated based on the target opening degree Sv (Sv is currently Seng) set in Step S108, the actual opening degree Pv obtained by conversion in Step S110, and the previous values thereof in accordance with Expression (3).

Then, in Step S112, the actuator operation amount Mv[n] is calculated from the previous value Mv[n−1] of the actuator operation amount and the feedback correction amount ΔMv calculated in Step S111 in accordance with Expression (2).

Then, in Step S113, the actuator operation amount Mv[n] calculated in Step S112 is output to the actuator 34, and the processing at the current calculation timing is exited.

In Step S107, when F is 1 (in the case of YES), the internal combustion engine required opening degree Seng is 0%. Thus, respective pieces of processing of the present invention of Steps S114 to S123 are carried out as processing for carrying out the full closing learning control.

First, in Step S114, the target opening degree Slrn for the full closing learning is set as the target opening degree Sv, and the operation proceeds to Step S115. The target opening degree Slrn for the full closing learning is an opening degree acquired from VL, which is the minimum value of the output voltage Vs of the position sensor 53 as a result of the deviation of the fully closed position toward a lower limit side, and, as illustrated in FIG. 7, is the target opening degree used to carry out the feedback control so as to positively press the WGV 31 at the operation position at which the exhaust bypass passage 30 is completely closed irrespective of the true fully closed position Vmin in the variation range.

Then, in Step S115, it is determined whether or not the absolute value of a difference between the current value of the output voltage of the position sensor 53 and Vs detected a predetermined period before is less than a set value. This is processing of determining whether or not |ΔVs|=|Vs[n]−Vs[n−1]|, which is the absolute value of the difference between the current Vs and Vs detected the predetermined period before, is sufficiently small, and is thus processing of determining whether or not the Vs has no longer substantially changed, that is, whether or not the WGV 31 is positively pressed against the operation position at which the exhaust bypass passage 30 is completely blocked.

When |ΔVs| is more than a set value (in a case of NO), Vs is determined to have changed, and the operation proceeds to Step S116. In Step S116, the counter C is cleared to 0, and the operation proceeds to Step S118. On the other hand, |ΔVs| is less than the set value (in a case of YES), Vs is considered to have no longer substantially changed, and the operation thus proceeds to Step S117. In Step S117, the counter C is incremented by 1, and the operation proceeds to Step S118.

Then, in Step S118, it is determined whether or not the state in which |ΔVs| is less than the set value has continued for the stop determination period ΔT or more, that is, whether or not C≥ΔT holds true.

As illustrated in FIG. 7, the above-mentioned processing of Steps S115 to S118 has a purpose of determining whether or not the period in which the opening degree of the WGV 31 stops at a certain degree and no longer changes exceeds ΔT under the state in which the feedback control is being applied to the opening degree of the WGV 31 toward the target opening degree Slrn for the full closing learning.

In Step S118, it is determined whether or not the count of the counter C is equal to or more than the stop determination period ΔT. When the count of the counter C is not equal to or more than the stop determination period ΔT (in a case of NO), the WGV 31 is determined to have not been pressed against the true fully closed position yet, and the operation proceeds from Step S118 to Steps S110 to S113. A description has been given of Steps S110 to S113.

On the other hand, in Step S118, when the count of the counter C is equal to or more than the stop determination period ΔT (in a case of YES), the WGV 31 is determined to be pressed against the true fully closed position, and the operation proceeds to Steps S119 to S123, and then to Steps S112 and S113.

In Step S119, the incremented counter C is cleared to 0. In Step S120, the target opening degree Sv is returned to the internal combustion engine required opening degree Seng. In Step S121, the full closing learned position Vmin is updated to the output voltage Vs of the position sensor 53. In Step S122, the output voltage Vs of the position sensor 53 is converted to the actual opening degree Pv based on the full closing learned position Vmin updated in Step S121. In Step S123, the processing of decreasing the feedback correction amount ΔMv, which is to be originally calculated, is carried out. In the first embodiment, as an example, ΔMv is set to 0. In other words, the integral term of Expression (3) is 0, and all of the proportional term and the FF term are also set to 0.

The processing of Steps S119 to S123 continues while it is determined in Step S104 that the internal combustion engine required opening degree Seng is 0%. When the internal combustion engine required opening degree Seng becomes no longer 0%, the operation proceeds in a sequence of Steps S104, S105, S107, and S108, and the processing of Steps S119 to S123 is no longer carried out.

Through the processing of the above-mentioned steps, the full closing learned position Vmin is updated, the target opening degree Sv is switched to the internal combustion engine required opening degree Seng as a result of the update of the full closing learned position Vmin, and further, the feedback correction amount ΔMv is decreased.

Through the above-mentioned operation, the unnecessary feedback correction amount is decreased, which is calculated at the control timing at which the learning control for the fully closed position of the WGV opening degree is finished, and the WGV opening degree is prevented from deviating from the target opening degree. As a result, the pressure of the intake air compressed by the compressor is prevented from deviating from the desired supercharging pressure.

Second Embodiment

A description is now given of an operation of a control device for an internal combustion engine according to a second embodiment of the present invention. A system configuration diagram of the internal combustion engine to which the control device for an internal combustion engine according to the second embodiment of the present invention is applied and a functional block diagram for illustrating the control device for an internal combustion engine are the same as FIG. 1 and FIG. 2, respectively.

However, in the second embodiment, the operation of FIG. 2 is different. Specifically, when the internal combustion engine required opening degree Seng is no longer the full closing of 0% before the stop determination period ΔT elapses, the full closing learning control unit 507 instructs the target opening degree setting unit 502 to return the target opening degree Sv to the internal combustion engine required opening degree Seng. Then, the full closing learning control unit 507 issues an instruction to decrease the correction amount of the feedback control to the feedback correction amount calculation unit 504.

Other processing is the same as that of the first embodiment.

Figure 4:
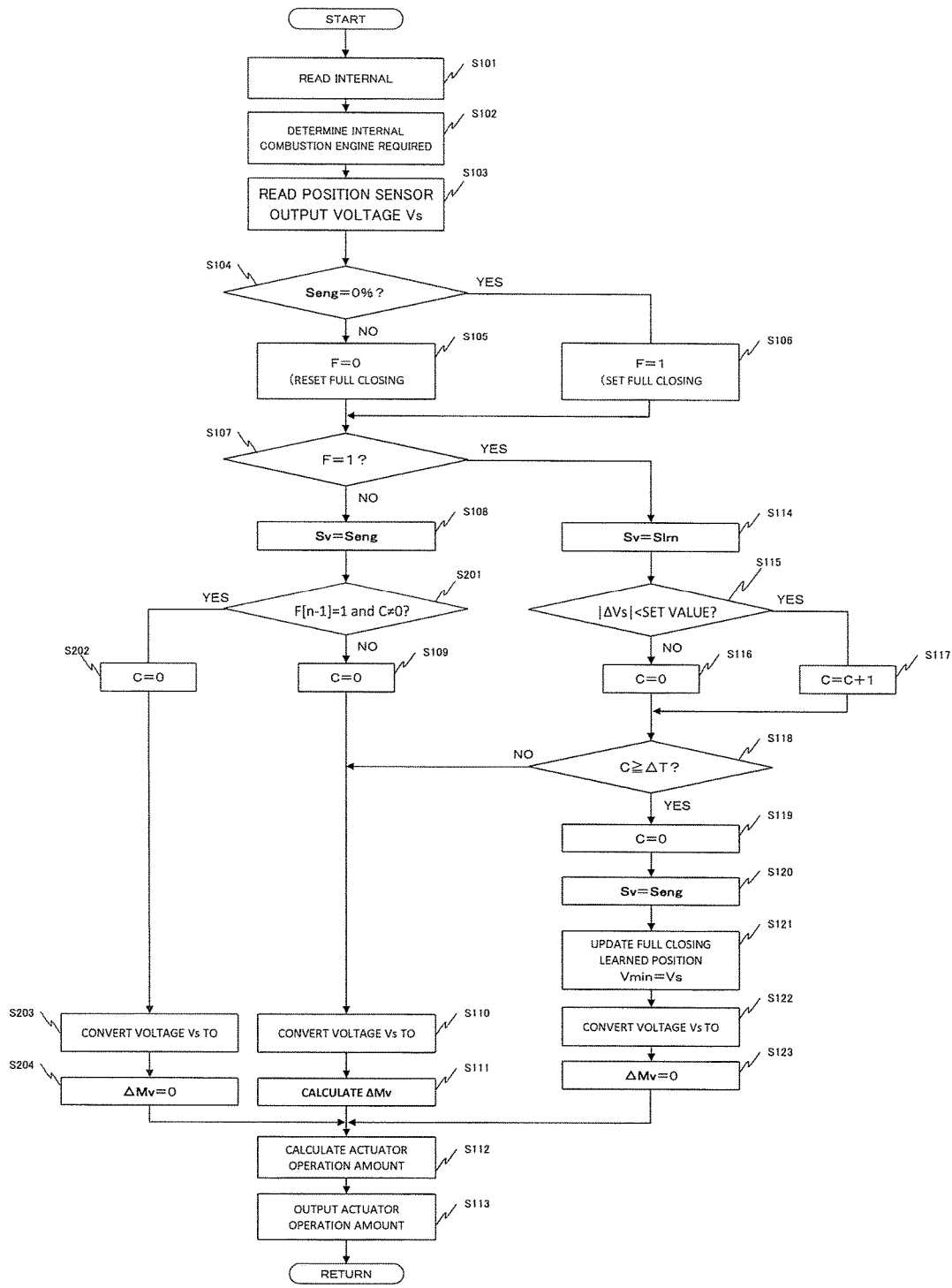
FIG. 4 is a flowchart for illustrating an operation of a control device for an internal combustion engine according to a second embodiment of the present invention.

Referring to a flowchart of FIG. 4, a description is now given of the operation of the control device for an internal combustion engine according to the second embodiment of the present invention.

FIG. 4 is a flowchart for illustrating the operation of the control device for an internal combustion engine according to the second embodiment of the present invention. In FIG. 4, Steps S101 to S123 are the same as those of the above-mentioned flowchart of FIG. 3 for illustrating the operation of the control device for an internal combustion engine according to the first embodiment, and a detailed description of Steps S101 to S123 is therefore omitted.

In the second embodiment of the present invention, Step S201, which is a decision block, is added between Steps S108 and S109 of FIG. 3. One exiting arrow of the decision block of Step S201 is connected to Step S109, and the other exiting arrow is connected to Step S202, which is newly added, thereby allowing the processing of Steps S202 to S204 to be carried out. Moreover, an exiting arrow of Step S204 is connected to Step S112.

In FIG. 3 of the first embodiment of the present invention, as described above, in Step S107, the state of the full closing learning flag F is determined, and when F is 0 (in the case of NO), the operation proceeds to Step S108. In Step S107, when F is 0 (in the case of NO), the internal combustion engine required opening degree is not 0%, and the full closing learning control is thus not carried out. The operation then proceeds to Step S108, and, in Step S108, the internal combustion engine required opening degree Seng is set as the target opening degree Sv. In FIG. 4 of the second embodiment of the present invention, after Step S108, the processing of Step S201 is carried out.

Specifically, in Step S201, based on the previous value F[n−1] of the full closing learning flag F and the current state of the counter C, it is determined whether or not F[n−1]=1 and C≠0 are simultaneously satisfied. On this occasion, in Step S107, the full closing learning flag F has already been determined to be 0. Therefore, the state in which F[n−1]=1 indicates that F is changed from 1 at the previous calculation timing to 0 at the current calculation timing. Simultaneously, the state in which the counter C is not 0 indicates that the processing of determining the stop has been in progress to some extent at the previous calculation timing. In other words, the determination of "YES" made in Step S201 means that the internal combustion engine required opening degree Seng becomes no longer the full closing of 0% before the stop determination period ΔT elapses after the full closing learning control starts as a result of the state in which the internal combustion engine required opening degree Seng becomes 0%. Thus, it can be considered that the internal combustion engine required opening degree Seng becomes no longer 0% before the full closing learned position Vmin is updated, and the full closing learning control is consequently finished.

Thus, in Step S201, when the determination of "YES" is made, the operation proceeds from Step S201 to Step S202. In Step S202, as in Step S109, the counter C is cleared to 0.

Subsequently, in Step S203, as in Step S110, based on the current full closing learned position Vmin, the output voltage Vs of the position sensor 53 is converted to the actual opening degree Pv, and the operation proceeds to Step S204.

Then, in Step S204, as in Step S123, the feedback correction amount ΔMv is decreased. In Step S204, as an example, ΔMv is also set to 0 as in the first embodiment.

Through the processing of the above-mentioned steps, the feedback correction amount ΔMv is decreased, which is calculated immediately after the full closing learning control is finished as a result of the state in which the internal combustion engine required opening degree becomes no longer 0% before the full closing learned position Vmin is updated after the full closing learning control starts.

Then, from Step S204, the operation proceeds to Steps S112 to S113.

In Step S201, when a determination of "NO" is made, the same processing as that of Steps S109 to S113 of FIG. 3 is carried out, and the processing is then exited.

Through the above-mentioned operation, the unnecessary feedback correction amount is decreased, which is calculated at the control timing at which the learning control for the fully closed position of the WGV opening degree is finished, and the WGV opening degree is prevented from deviating from the target opening degree. As a result, the pressure of the intake air compressed by the compressor is prevented from deviating from the desired supercharging pressure.

A description is given of an example in which, in Steps S123 and S204 of FIG. 3 and FIG. 4, the feedback correction amount ΔMv in the form of the sum of the respective calculation terms, which are the integral term, the proportional term, and the FF term, is set to 0. However, feedback gains (an integral gain Ki, a proportional gain Kp, and an FF gain Kf) for calculating the calculation terms causing the generation of the unnecessary feedback correction amount may be set to 0, and the respective calculation terms may then be calculated. In particular, in Step S204 of FIG. 4, 15% of the integral term out of the above-mentioned integral term, proportional term, and FF term may be retained, and only the gain Kp of the proportional term and the gain Kf of the FF term may be set to 0.

This is implemented by a configuration in which, in FIG. 2, the full closing learning control unit 507 issues only the decrease instruction to the feedback correction amount calculation unit 504, and the feedback correction amount calculation unit 504 itself switches the integral gain Ki, the proportional gain Kp, the FF gain Kf, and the like, which are internally stored.

Alternatively, the feedback gains may be switched to such small values that the occurrence of the fluctuation of the actual opening degree, which is the problem, is suppressed to a permissible level, thereby calculating the respective calculation terms.

The invention claimed is:

1. A control device for controlling a waste gate valve of an internal combustion engine, the control device being configured to: input information about an operation state of the internal combustion engine and information about a position of an actuator configured to control an opening degree of the waste gate valve provided in an exhaust bypass passage of the internal combustion engine; acquire an internal combustion engine required opening degree of the waste gate valve based on the operation state; and apply feedback control to the actuator while the internal combustion engine required opening degree is set as a target opening degree of the waste gate valve to control the actuator to control the opening degree of the waste gate valve, wherein, when the internal combustion engine required opening degree is full closing, full closing learning control is carried out by converting the target opening degree of the waste gate valve to a target opening degree for full closing learning so that the waste gate valve is brought into a fully closed state in which the waste gate valve fully closes the exhaust bypass passage, and when a state in which the position of the actuator does not change consequently continues for a set period, it is determined that the fully closed state is reached and the full closing learning is finished, and a correction amount for the feedback control is decreased.

2. The control device for controlling the waste gate valve of the internal combustion engine according to claim 1, comprising:
   an internal combustion engine required opening degree determination unit configured to determine the internal combustion engine required opening degree based on the operation state of the internal combustion engine;
   a target opening degree setting unit configured to set the internal combustion engine required opening degree as the target opening degree of the waste gate valve;
   a full closing learning control unit configured to carry out the full closing learning control of converting the target opening degree of the waste gate valve to the target opening degree for full closing learning so that the waste gate valve is brought into the fully closed state in which the waste gate valve fully closes the exhaust bypass passage when the internal combustion engine required opening degree is set to the full closing, and updating an operation position of the waste gate valve represented by the position of the actuator as a full closing learned position when the continuation of the fully closed state for the set period is detected from the change in the position of the actuator;
   an actual opening degree conversion unit configured to convert the operation position of the waste gate valve to an actual opening degree based on the full closing learned position;
   a feedback correction amount calculation unit configured to calculate a feedback correction amount for resolving a deviation between the target opening degree and the actual opening degree at each calculation timing;
   an actuator operation amount calculation unit configured to add the feedback correction amount and an actuator operation amount output to the actuator at a previous calculation timing, to thereby calculate an actuator operation amount to be output to the actuator at a current calculation timing; and
   an actuator drive unit configured to output the actuator operation amount to the actuator to control the actuator to control the opening degree of the waste gate valve,
   wherein the full closing learning control unit is configured to issue a decrease instruction to decrease the correction amount to the feedback correction amount calculation unit in response to a state in which the internal combustion engine required opening degree becomes the full closing, and
   wherein, when receiving the decrease instruction, the feedback correction amount calculation unit decreases the correction amount at an end of the full closing learning control when the set period has elapsed.

3. The control device for controlling the waste gate valve of the internal combustion engine according to claim 1,
   wherein, when the internal combustion engine required opening degree becomes no longer the full closing before the set period elapses, the target opening degree is returned to the internal combustion engine required opening degree, the actuator is controlled to control the opening degree of the waste gate valve in accordance with the target opening degree, and the correction amount is simultaneously decreased.

4. The control device for controlling the waste gate valve of the internal combustion engine according to claim 2,
   wherein the full closing learning control unit is configured to instruct the target opening degree setting unit to return the target opening degree to the internal combustion engine required opening degree in response to a state in which the internal combustion engine required opening degree becomes no longer the full closing before the set period elapses, and simultaneously issue the decrease instruction to the feedback correction amount calculation unit, to thereby decrease the correction amount.

5. The control device for controlling the waste gate valve of the internal combustion engine according to claim 1, wherein the correction amount is decreased to zero.

6. The control device for controlling the waste gate valve of the internal combustion engine according to claim 1,
   wherein the correction amount is decreased by setting all gains of respective calculation terms of the feedback control to such small values that occurrence of fluctuation of an actual opening degree of the waste gate valve is suppressed to a permissible level.

7. The control device for controlling the waste gate valve of the internal combustion engine according to claim 5,
   wherein the correction amount is decreased to zero by setting all gains of respective calculation terms of the feedback control to zero.

8. The control device for controlling the waste gate valve of the internal combustion engine according to claim 3, wherein the correction amount is decreased by setting gains of only a proportional term and an FF term out of respective calculation terms of the feedback control to zero.

* * * * *